United States Patent [19]
Chin-Kuan et al.

[11] Patent Number: 6,023,031
[45] Date of Patent: Feb. 8, 2000

[54] COMPUTER POWER CENTER

[75] Inventors: Lou Chin-Kuan; Liu Sen-Hsiang, both of Taipei Hsien; Pan Hui-Jen, Chi-Lung, all of Taiwan

[73] Assignee: Primax Electronics Ltd., Taipei Hsien, Taiwan

[21] Appl. No.: 09/182,291

[22] Filed: Oct. 27, 1998

[51] Int. Cl.$^7$ .................................................... H01R 19/00
[52] U.S. Cl. .......................... 200/51.04; 439/654; 174/57
[58] Field of Search .............................. 200/51.04, 51.07, 200/51.09, 51 R, 293–307; 174/53, 57; 437/638, 650, 654

[56] References Cited

U.S. PATENT DOCUMENTS

| | | | |
|---|---|---|---|
| 5,457,600 | 10/1995 | Campbell et al. | 361/643 |
| 5,649,839 | 7/1997 | Yu | 439/650 |

*Primary Examiner*—Lincoln Donovan
*Assistant Examiner*—Nhung Nguyen
*Attorney, Agent, or Firm*—Winston Hsu

[57] ABSTRACT

The present invention provides a computer power center for providing power to various peripheral devices of a computer. The power center comprises a front housing, a power circuit, a rear housing and a hinge for connecting the front and rear housings. The front housing has a front control panel, a flat upper end, and a rear end with a plurality of power sockets. The rear housing has a front end, a flat upper end, and a recess on its bottom end. The front and rear housings of the power center can be extended so that the upper ends of the front and rear housings can form a combined flat upper end for loading a computer monitor on it. And the rear housing can be folded under the front housing when the power center is not in use so that the size of the power center can be substantially reduced.

8 Claims, 9 Drawing Sheets

COMPUTER POWER CENTER

BACKGROUND OF THE INVENTION

1. Field of the Invention

The present invention relates to a power center, and more particularly, to a computer power center for providing power to various peripheral devices of a computer.

2. Description of the Prior Art

Please refer to FIG. 1. FIG. 1 is a perspective view of a prior art computer power center 10. The power center 10 is used to provide electric power to various peripheral devices of a computer. It comprises a rectangular housing 12 and a power circuit (not shown) installed inside the housing 12. The housing 12 comprises a front control panel 14, a flat upper end 16, and a rear end 18 with a plurality of sockets 20. The power circuit comprises a plurality of power connectors (not shown) installed in the housing 12 and attached to the sockets 20 for connecting the power plugs of the peripheral devices to supply electric power, and a plurality of control switches (not shown) installed on the front control panel 14 for controlling the power connectors.

When the power center 10 is placed on a desk, the flat upper end 16 of the power center's housing 12 is used for loading a computer monitor on it so that it will not occupy too much space on the desk. Although the size of the housing 12 is quite bulky and most of its internal portion is empty, it can not be shrunk because the size of its flat upper end 16 must be big enough to load a computer monitor. The power center's big housing usually occupies a lot of useful space when packing or shipping, and such big size is useful only when it is stacked under a computer monitor.

SUMMARY OF THE INVENTION

It is therefore a primary objective of the present invention to provide a computer power center with a foldable housing to solve the above mentioned problems.

In a preferred embodiment, the present invention provides a computer power center for providing power to various peripheral devices of a computer comprising:

a substantially rectangular front housing having a front control panel, a flat upper end, and a rear end with a plurality of sockets;

a power circuit having a plurality of power connectors installed in the front housing and attached to the sockets for connecting power plugs of the peripheral devices to supply electric power, and a plurality of control switches installed in the front control panel for controlling the power connectors;

a rear housing having a front end, a flat upper end, and a recess on its bottom end; and an engaging means for engaging the front end of the rear housing to the rear end of the front housing so as to form a combined flat upper end for loading a computer monitor by using the flat upper ends of the front and rear housings;

wherein when the front end of the rear housing is engaged with the rear end of the front housing, the power plugs of the peripheral devices can be connected to the power connectors at the rear end of the front end of the housing through the bottom recess.

It is an advantage of the present invention that the front housing and the rear housing can be folded into a smaller unit when the power center is not in use and thus the overall size of the power center can be reduced.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
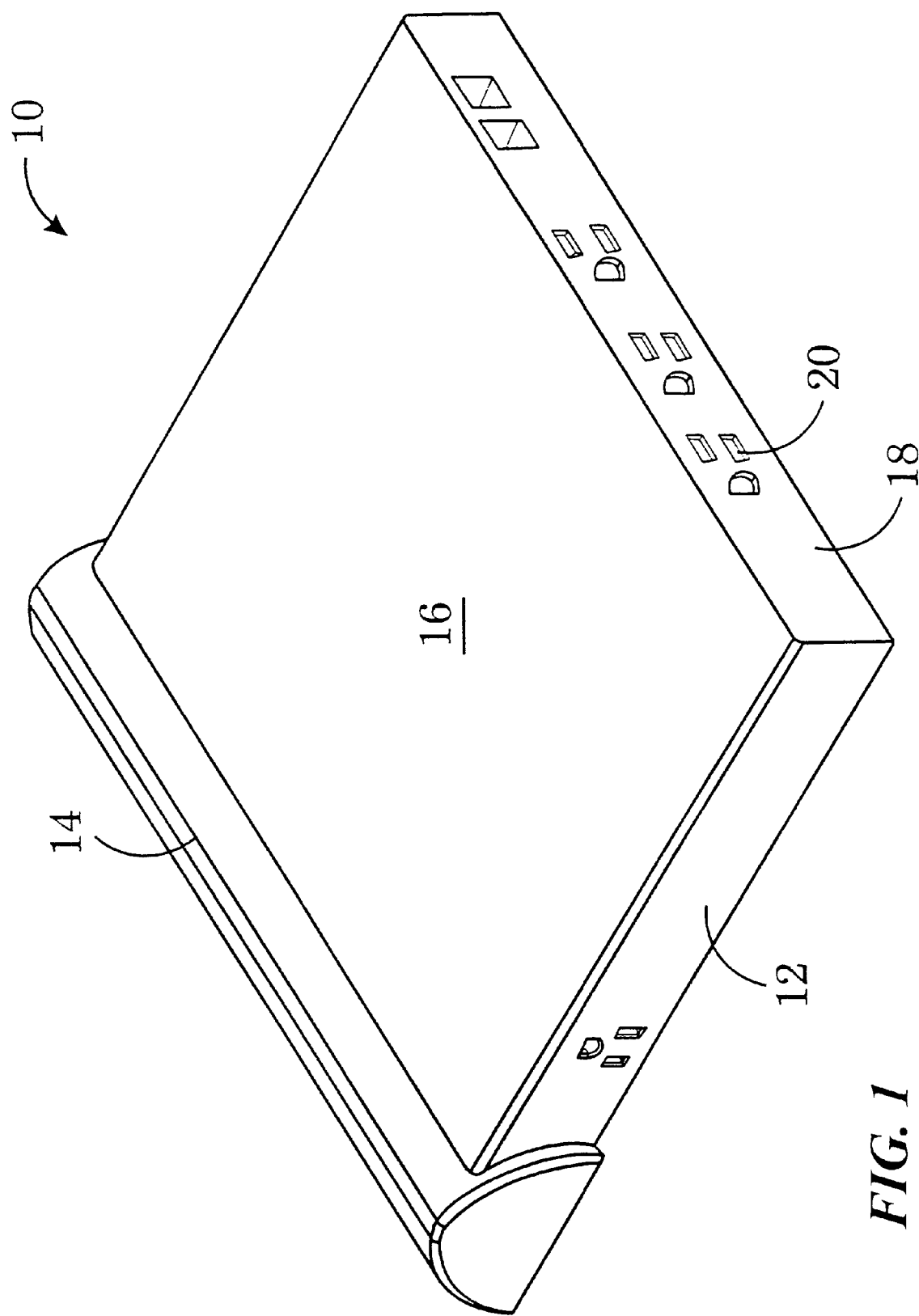
FIG. 1 is a perspective view of a prior art computer power center.
Figure 2:
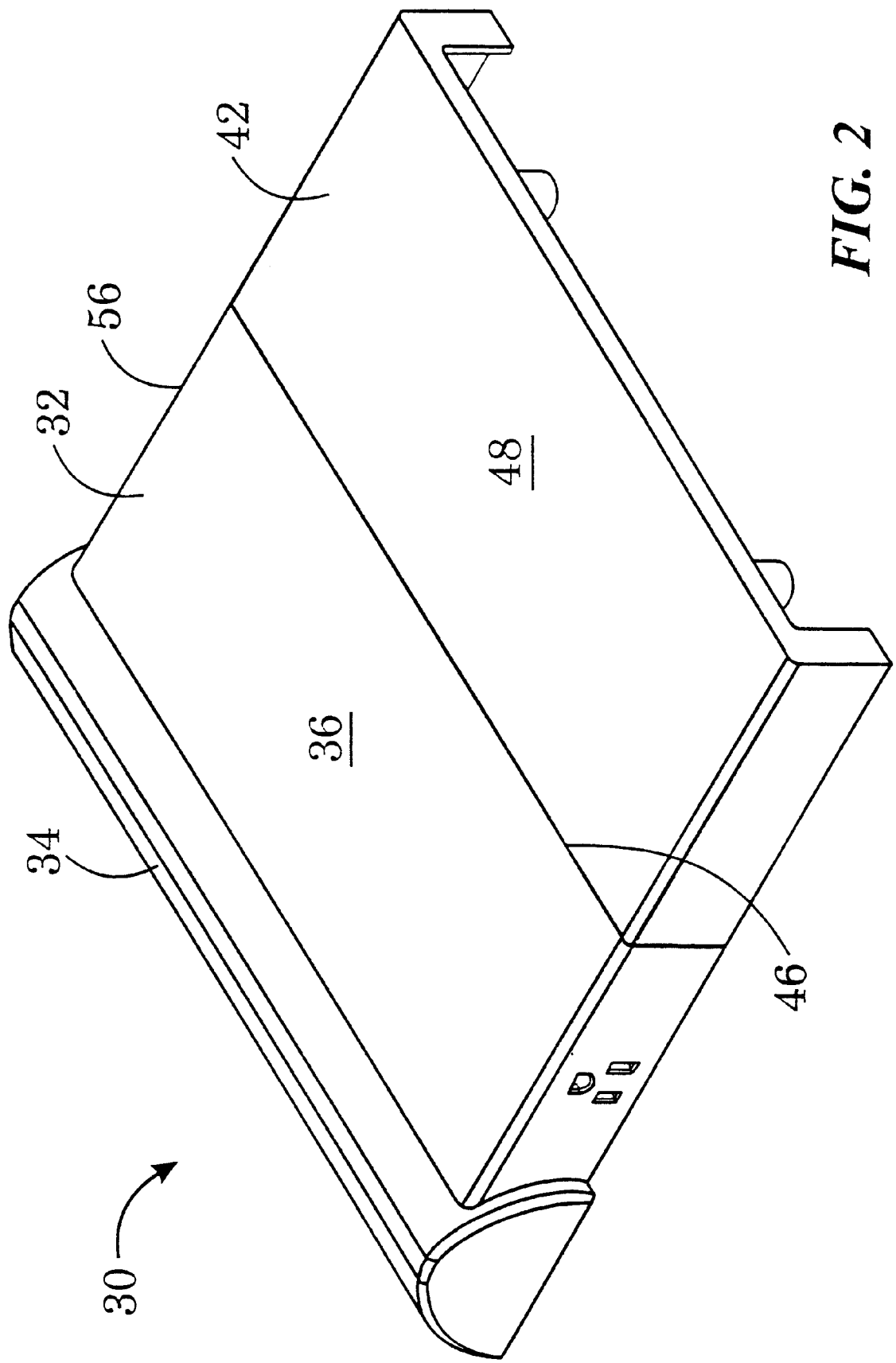
FIG. 2 is a perspective view of a computer power center according to the present invention.
Figure 3:
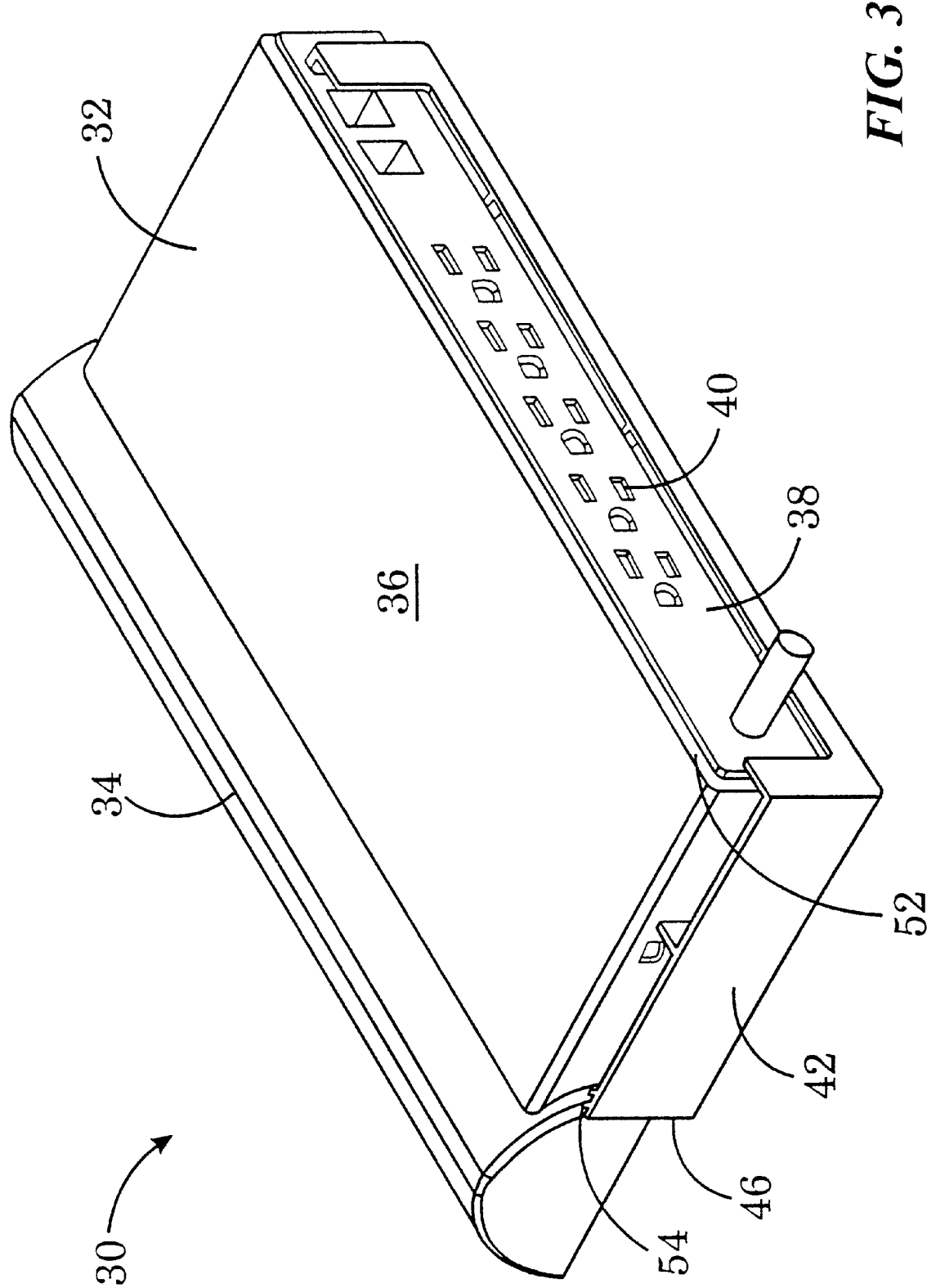
FIGS. 3 and 4 are perspective views of the power center in FIG. 2 in a folded position.
Figure 4:
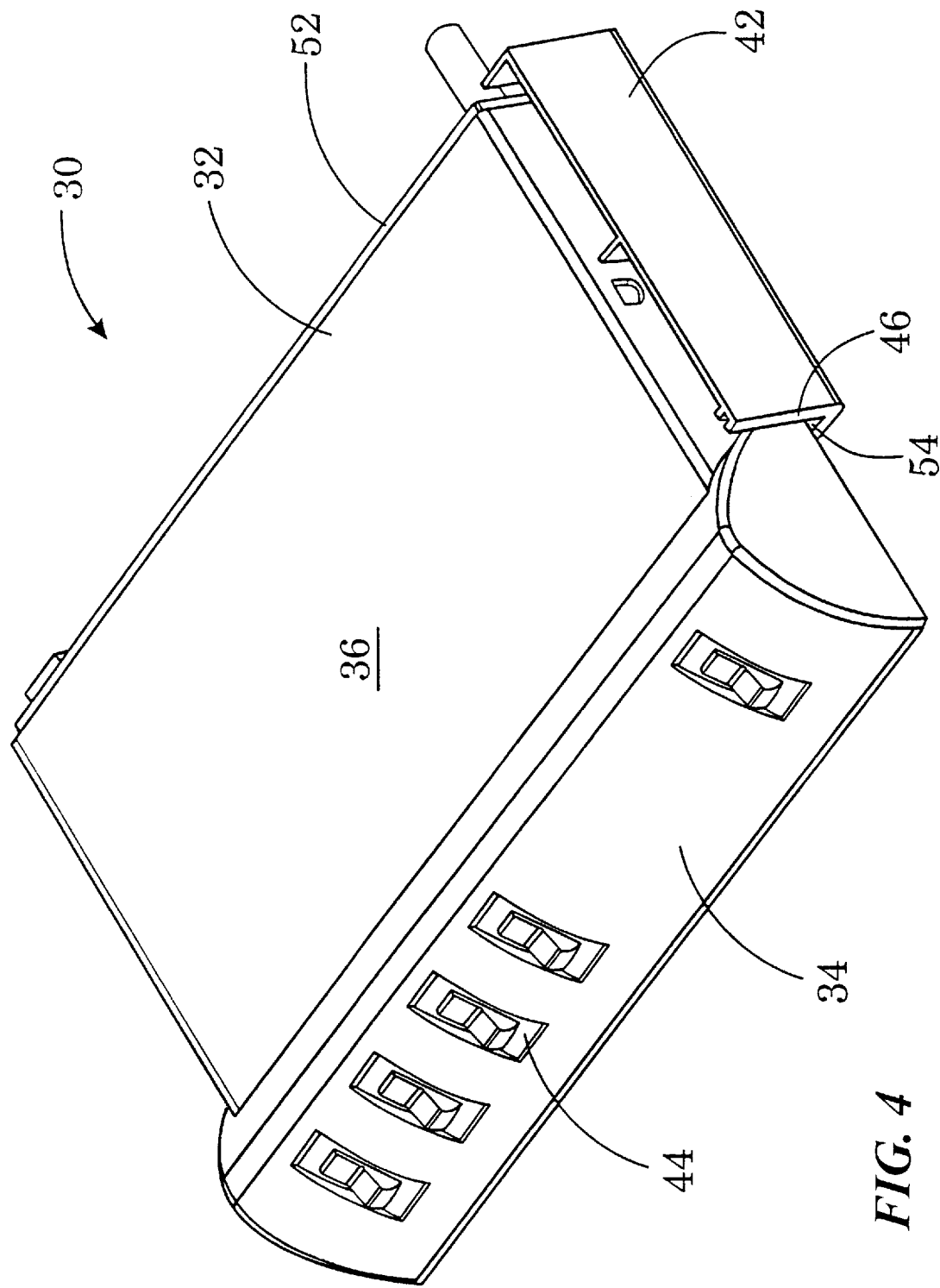
Figure 5:
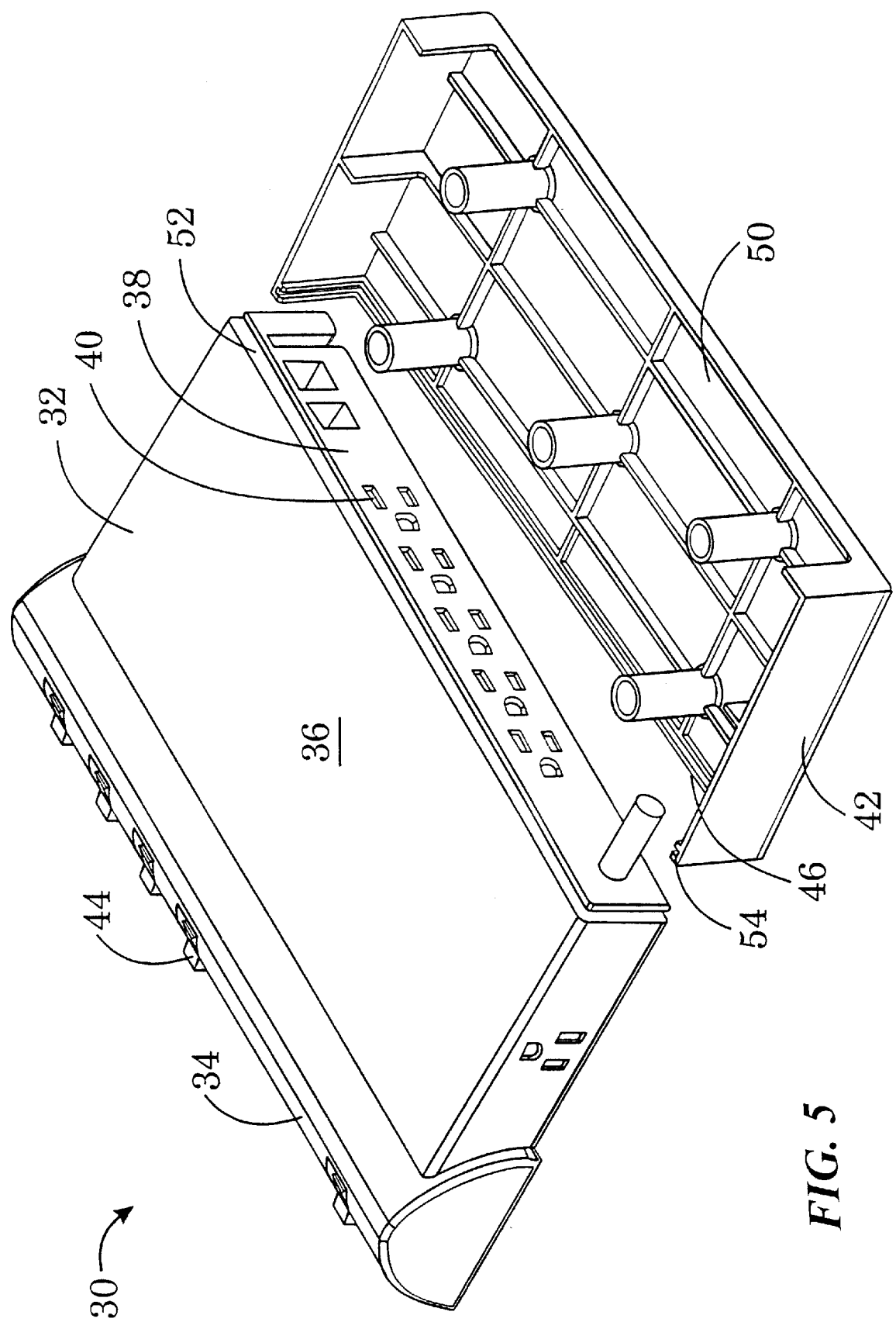
FIGS. 5 and 6 are two perspective views of the power center shown in FIG. 2 which is disassembled into two parts.
Figure 6:
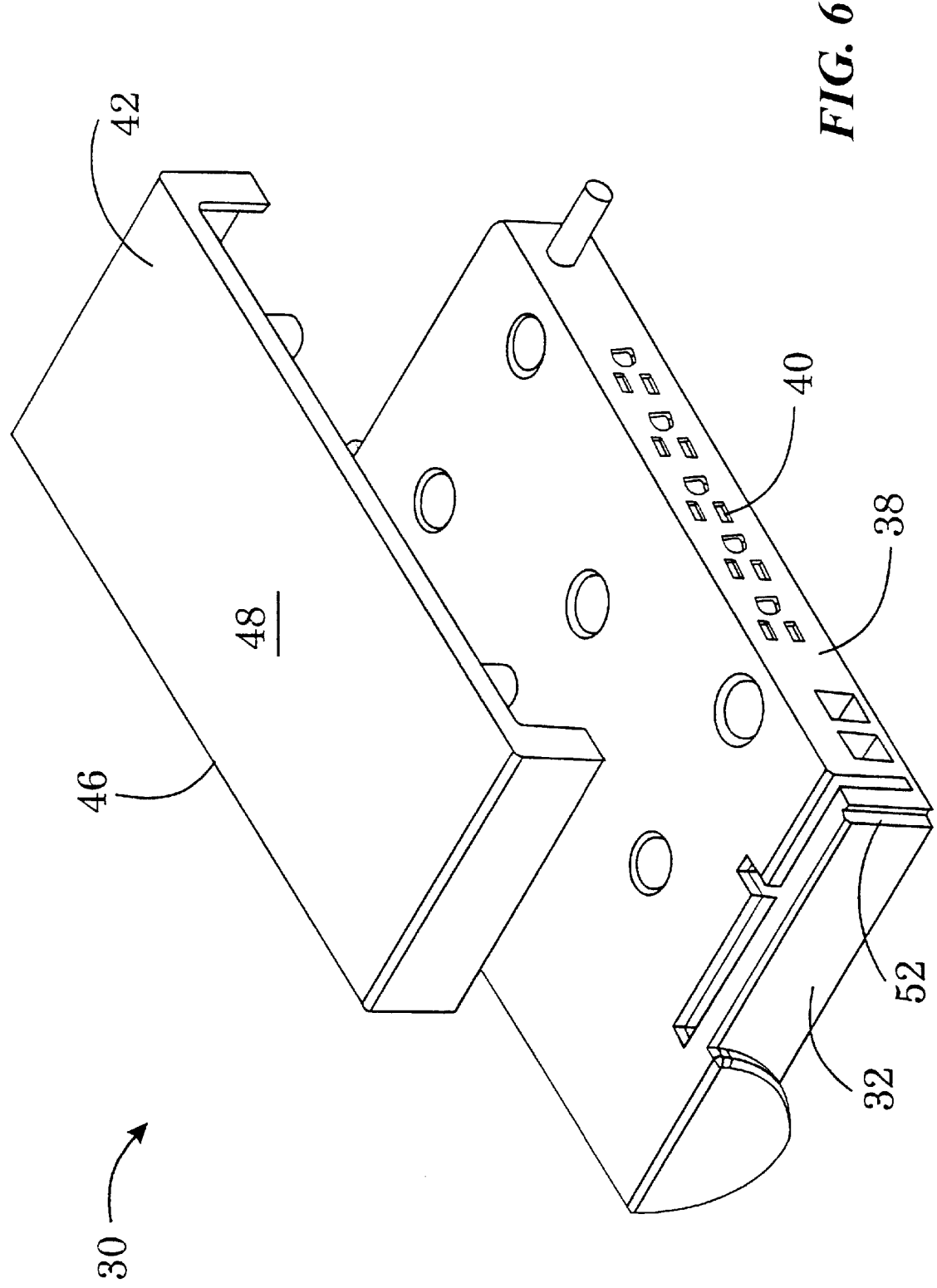

Please refer to FIGS. 2 to 6. FIG. 2 is a perspective view of a computer power center 30 according to the present invention. FIGS. 3 and 4 are perspective views of the power center 30 in a folded position. FIGS. 5 and 6 are two perspective views of the power center 30 which is disassembled into two parts.

The power center 30 comprises a rectangular front housing 32, a power circuit (not shown), and a rear housing 42. The front housing 32 has a front control panel 34, a flat upper end 36, and a rear end 38 with a plurality of sockets 40. The power circuit has a plurality of power connectors (not shown) installed in the front housing 32 and attached to the sockets 40 for connecting power plugs of peripheral devices to supply electric power, and a plurality of control switches 44 installed in the front control panel 34 for controlling the power connectors. The rear housing 42 has a front end 46, a flat upper end 48 approximately the same size as the flat upper end 36, and a recess 50 on its bottom end. The front housing 32 and rear housing 42 can be combined together and the flat upper ends 36 and 48 of the front housing 32 and rear housing 42 will form a combined flat upper end 56 for supporting a computer monitor.

The front housing 32 comprises a protruding edge 52 installed around its rear end 38. The rear housing 42 comprises a corresponding engaging slot 54 installed around its front end 46 for engaging the protruding edge 52 of the front housing 32. When the front housing 32 and rear housing 42 are combined, the engaging slot 54 of the rear housing 42 attaches to the protruding edge 52 of the front housing 32 forming a combined flat upper end 56, and the power plugs of the peripheral devices are connected to the power connectors at the rear end 38 of the front housing 32 through the recess 50 over the bottom end of the recess 50. When the rear housing 42 is detached from the front housing 32, the recess 50 on the bottom end of the rear housing 42 will be placed under and engaged with the bottom end of the front housing 32 so that the overall size of the power center 30 can be reduced.

Figure 7:
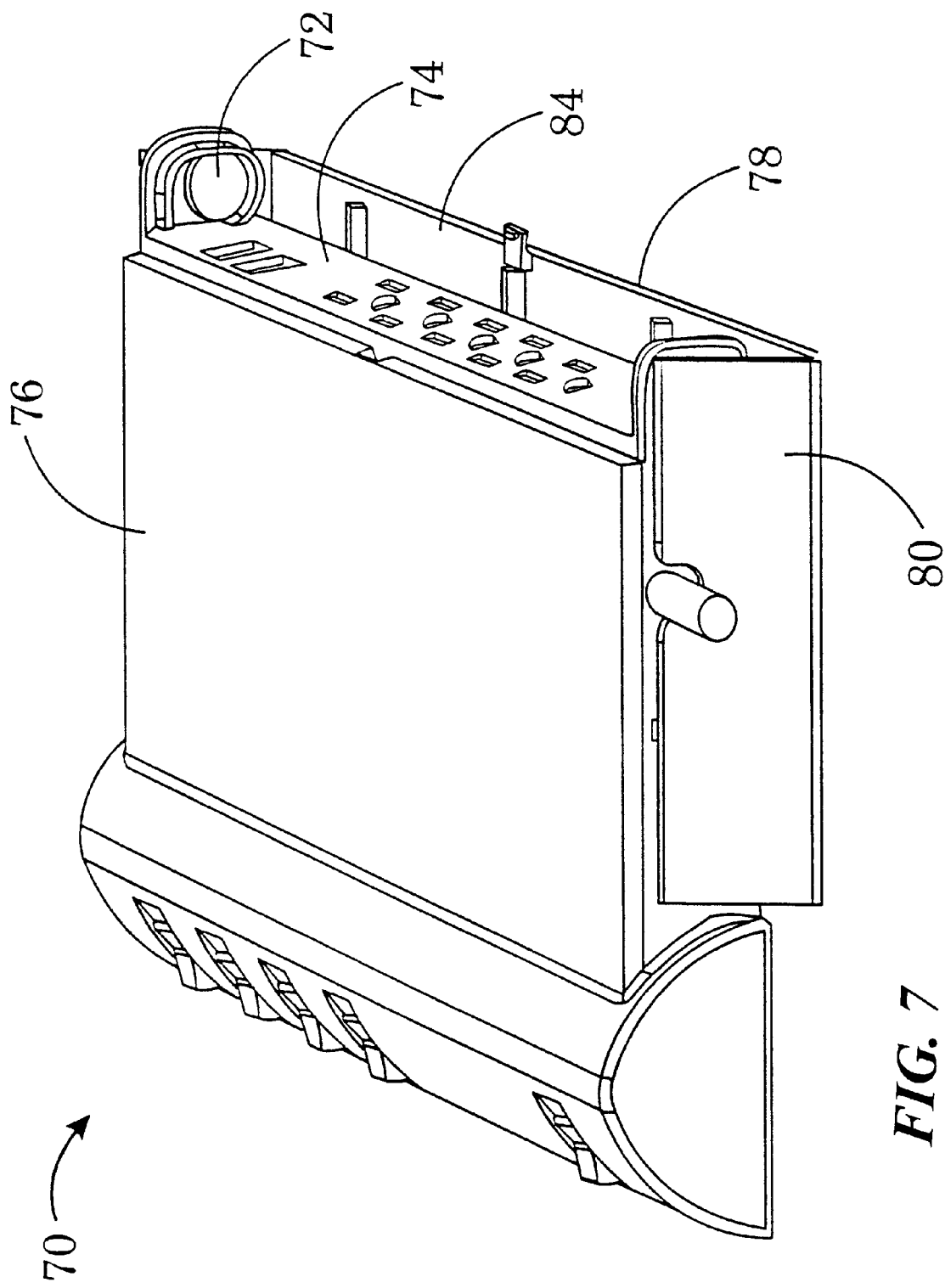
FIG. 7 is a perspective view of another power center in a folded position according to the present invention.
Figure 8:
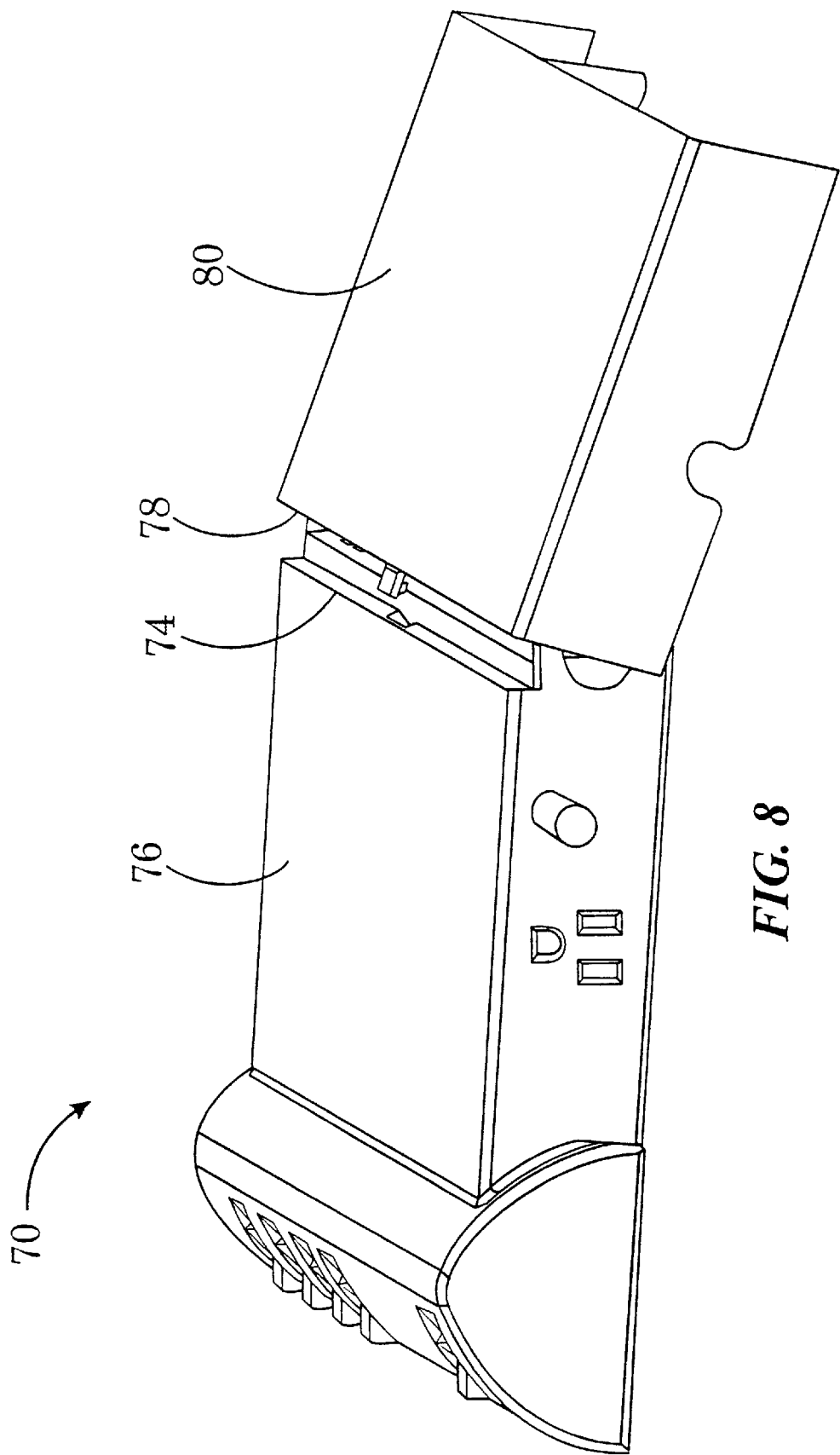
FIG. 8 is a perspective view showing the top of the power center in FIG. 7.
Figure 9:
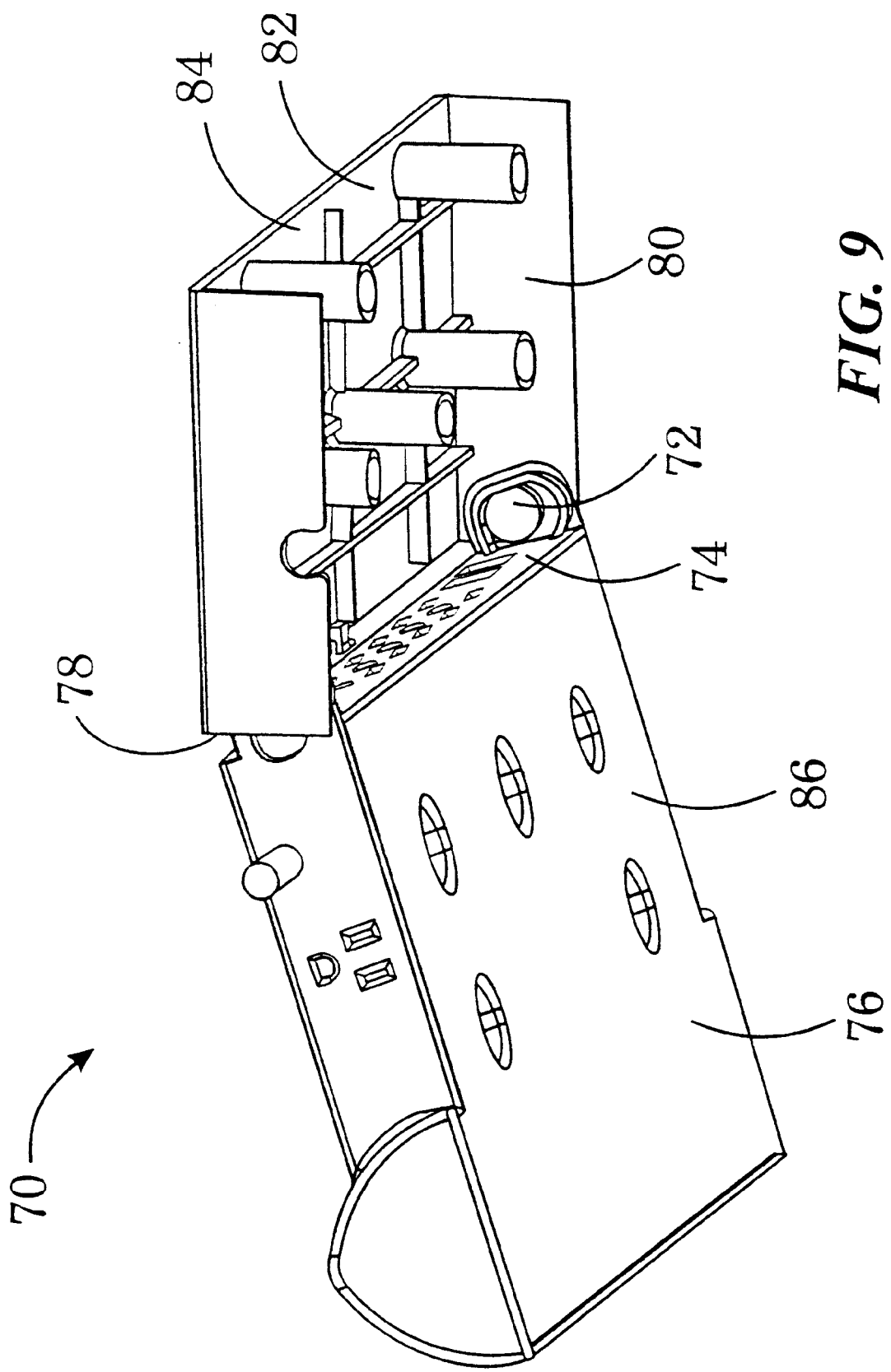
FIG. 9 is a perspective view showing the bottom of the power center in FIG. 7.

Please refer to FIGS. 7 to 9. FIG. 7 is a perspective view of another power center 70 in a folded position according to the present invention. FIG. 8 is a perspective view showing the top end of the power center 70. FIG. 9 is a perspective view showing the bottom end of the power center 70.

The power center 70 comprises a hinge 72 installed between the rear end 74 of the front housing 76 and the front end 78 of the rear housing 80. When the rear housing 80 is folded under the front housing 76, the recess 82 on the bottom end 84 of the rear housing 80 is engaged with the bottom end 86 of the front housing 76 so that the overall size of the power center 70 can be reduced.

Compared with the prior art power center 10, the front and rear housings of the power center 30 and 70 can be combined to form a combined flat upper end so that a computer monitor can be loaded on it. They also can be folded to reduce its size when not in use so that shipping space can be greatly reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power center for providing power to various peripheral devices of a computer comprising:

a substantially rectangular front housing having a front control panel, a flat upper end, and a rear end with a plurality of sockets;

a power circuit having a plurality of power connectors installed in the front housing and attached to the sockets for connecting power plugs of the peripheral devices to supply electric power, and a plurality of control switches installed in the front control panel for controlling the power connectors;

a rear housing having a front end, a flat upper end, and a recess on its bottom end; and engaging means for engaging the front end of the rear housing to the rear end of the front housing so as to form a combined flat upper end for loading a computer monitor by using the flat upper ends of the front and rear housings;

wherein when the front end of the rear housing is engaged to the rear end of the front housing, the power plugs of the peripheral devices can be connected to the power connectors at the rear end of the front housing through the recess over the bottom end of the recess.

2. The power center of claim 1 wherein the size of the flat upper ends of the front and rear housings are approximately equal.

3. The power center of claim 1 wherein the engaging means comprises a protruding edge installed around the rear end of the front housing and an engaging slot installed on the front end of the rear housing wherein the engaging slot of the rear housing is attached to the protruding edge of the front housing when the front and rear housings are combined together for loading the computer monitor.

4. The power center of claim 3 wherein when the rear housing is detached from the front housing, the recess on the bottom end of the rear housing can be used to engage the front housing so as to reduce the overall size of the power center.

5. The power center of claim 4 wherein the recess on the bottom end of the rear housing is used to engage a bottom end of the front housing.

6. The power center of claim 1 wherein the engaging means comprises a hinge installed between the rear end of the front housing and the front end of the rear housing so that the rear housing can be folded under the front housing to reduce the overall size of the power center.

7. The power center of claim 6 wherein when the rear housing is folded under the front housing, the recess on the bottom end of the rear housing is engaged with a bottom end of the front housing so as to reduce the overall size of the power center.

8. The power center of claim 1 wherein the engaging means comprises two sliding slots installed over two sides of the recess of the rear housing wherein the two sliding slots of the rear housing are slidably engaged with left and right ends of the front housing wherein when the rear housing is in an extended position, the combined flat upper end can be used to load the computer monitor, and when the rear housing is in an extracted position, the overall size of the power center can be reduced.

* * * * *